United States Patent
Basu et al.

(10) Patent No.: US 8,268,896 B2
(45) Date of Patent: Sep. 18, 2012

(54) CO-PRODUCTION OF FUELS, CHEMICALS AND ELECTRIC POWER USING GAS TURBINES

(75) Inventors: Arunabha Basu, Aurora, IL (US); Iosif K Rabovitser, Skokie, IL (US); John J Lewnard, Inverness, IL (US); John M Pratapas, Naperville, IL (US); Howard S Meyer, Hoffman Estates, IL (US); Dennis Leppin, Chicago, IL (US); Dmitri Boulanov, Buffalo Grove, IL (US)

(73) Assignee: Gas Technology Institute, Des Plaines, IL (US)

( * ) Notice: Subject to any disclaimer, the term of this patent is extended or adjusted under 35 U.S.C. 154(b) by 320 days.

(21) Appl. No.: 12/698,428

(22) Filed: Feb. 2, 2010

(65) Prior Publication Data
US 2011/0034569 A1    Feb. 10, 2011

Related U.S. Application Data

(60) Provisional application No. 61/232,053, filed on Aug. 7, 2009.

(51) Int. Cl.
*C07C 27/00* (2006.01)
*F02C 6/18* (2006.01)

(52) U.S. Cl. ...... 518/700; 60/780; 60/39.12; 60/39.464; 60/39.465; 60/39.182; 518/702; 518/703; 518/705

(58) Field of Classification Search .................. None
See application file for complete search history.

(56) References Cited

U.S. PATENT DOCUMENTS

| | | | | |
|---|---|---|---|---|
| 4,341,069 | A * | 7/1982 | Bell et al. | 60/781 |
| 5,666,800 | A * | 9/1997 | Sorensen et al. | 60/781 |
| 6,061,936 | A * | 5/2000 | Jahnke | 60/39.12 |
| 6,306,917 | B1 | 10/2001 | Bohn et al. | |
| 6,596,780 | B2 | 7/2003 | Jahnke et al. | |
| 7,421,835 | B2 | 9/2008 | Rabovitser et al. | |
| 7,739,875 | B2 * | 6/2010 | Bartlett | 60/780 |
| 2003/0083390 | A1 * | 5/2003 | Shah et al. | 518/702 |

OTHER PUBLICATIONS

He, S., et al., Combinatin of CO2 reforming and partial oxidatin of methane to produce syngas over Ni/SiO2 and Ni-Al2O3/SiO2 catalyst with different precursors, 2008, International Journal of Hydrogen Energy, vol. 34, pp. 839-843.*
Choi, G.N. et al., "Design/Economics of a Once-Through Natural Gas Fischer-Tropsch Plant With Power Co-Production", www.netl.doe.gov/publications/proceedings/97/97cl/choi.pdf, 1997.
Bibber, L.V. et al., "Baseline Technical and Economic Assessment of a Commercial Scale Fischer-Tropsch Liquids Facility", DOE/NETL—2007/1260, Apr. 9, 2007.

* cited by examiner

*Primary Examiner* — Yate K Cutliff
(74) *Attorney, Agent, or Firm* — Mark E. Fejer

(57) ABSTRACT

A method and system for co-production of electric power, fuel, and chemicals in which a synthesis gas at a first pressure is expanded using a stand-alone mechanical expander or a partial oxidation gas turbine, simultaneously producing electric power and an expanded synthesis gas at a second pressure after which the expanded synthesis gas is converted to a fuel and/or a chemical.

21 Claims, 8 Drawing Sheets

CO-PRODUCTION OF FUELS, CHEMICALS AND ELECTRIC POWER USING GAS TURBINES

BACKGROUND OF THE INVENTION

1. Field of the Invention

This invention relates to a method and system for co-producing fuels, chemicals, and electric power. In one aspect, this invention relates to the use of mechanical expanders and gas turbines for co-producing fuels, chemicals, and electric power. In one aspect, this invention relates to the use of gas turbines for the production of synthetic gas, also referred to as syngas, and electric power, and the subsequent conversion of the syngas to various liquid fuels and/or chemicals.

2. Description of Related Art

There are a variety of known processes for the generation of synthesis gas. U.S. Pat. No. 6,306,917 B1 to Bohn et al. teaches a method and apparatus for producing power, liquid hydrocarbons and carbon dioxide from heavy feedstocks using a partial oxidation reactor to produce synthesis gas, a Fischer-Tropsch (FT) reactor to convert the synthesis gas to hydrocarbon products and tail gases containing hydrogen and carbon dioxide, and a combined cycle plant to produce power from steam generated by recovering heat from the reactors and from combustible tail gases. U.S. Pat. No. 6,596,780 B2 to Jahnke et al. teaches a method for generating syngas comprising $H_2$ and $CO_2$ by gasification of hydrocarbonaceous fuels, such as coal, oil or gas, scrubbing the syngas free of particles, and saturating with water. The syngas is then treated in an acid gas removal unit as desired to remove any impurities in the syngas after which it is routed to a hydrocarbon synthesis reactor in which the $H_2$ and $CO_2$ in the syngas are converted to synthetic hydrocarbons. The unreacted tailgas exiting the reactor is sent to a gas turbine as fuel.

Gas turbines are one of the major sources for power generation in use today. However, the best efficiency achieved to date using simple cycle gas turbines is only about 38%. One significant drawback of gas turbines is that a significant portion of fuel energy input to the gas turbines, approximately 62-75%, is lost in the turbine exhaust. This exhaust energy is in the form of thermal energy only, which makes it difficult to use for effective power generation. Staged reheat gas turbines have the capability to improve both efficiency and $NO_x$ emissions. In some gas turbines, fuel staging has been employed. Fuel staging improves system efficiency but has limited application due to combustion instability problems, particularly in the first stage, high $NO_x$ emissions, and a large portion of thermal energy, about 55-65%, in the turbine exhaust. U.S. Pat. No. 7,421,835 B2 to Rabovitser et al. teaches a two-stage power generation system having a compressed air source with two compressed air outlets, one of which provides compressed air to the first stage of power generation and the other of which provides compressed air to the second stage of power generation. All of the fuel for the two-stage power generation system is introduced into the first stage. Exhaust gases from the first stage are introduced into a fuel inlet of the second stage of power generation. The first stage preferably includes a gas turbine operated in partial oxidation mode. The exhaust gases from the partial oxidation gas turbine contain thermal and chemical energy, both of which are used in the second stage. In accordance with one embodiment, the exhaust gases are split into two streams, one of which is employed for power generation and the other of which is used for hydrogen production.

For conventional syngas generation processes such as steam methane reforming (STR), shown in FIG. 7, and autothermal reforming (ATR), shown in FIG. 8, involving the reactions of natural gas with oxygen and steam that uses a catalytic reactor or a non-catalytic partial oxidation ($PO_x$) reactor, the outlet temperature of the syngas is limited, typically to about 1600-1700° F. at pressures of about 20-40 atm, due to limitations of the metallurgy for the equipment such as a waste heat boiler for production of steam used in the syngas cooling step, and due to the catalysts used for reforming reactions.

SUMMARY OF THE INVENTION

It is, thus, one object of this invention to provide a method and apparatus for co-producing fuels, chemicals, and electric power which overcomes the temperature limitations dictated by the metallurgy of the equipment used to make waste heat boilers and similar systems or devices for cooling the syngas.

It is another object of this invention to provide a method and apparatus for co-producing fuels, chemicals, and electric power which enables the generation of syngas at pressures higher than only about one atmosphere.

It is yet another object of this invention to provide a method and apparatus for co-producing fuels, chemicals, and electric power in which the composition of the syngas produced in the method is controlled so as to provide compositions favorable for liquids production.

These and other objects of this invention are addressed by a method for co-producing fuels, chemicals, and electric power in which a synthesis gas is generated in a reactor vessel, producing pressurized synthesis gas at a first pressure which is expanded using a stand-alone mechanical expander or partial oxidation gas turbine, simultaneously producing electric power and an expanded synthesis gas at a second pressure, and the expanded synthesis gas is converted to a fuel and/or a chemical. In contrast to a conventional gas turbine having a closed-coupled air compressor and expander system, the use of a stand-alone mechanical expander facilitates the generation of syngas at pressures substantially higher than about one atmosphere by employing significantly high back-pressures at the exit to the expander. For syngas production using natural gas, the volume (or total number of moles) of syngas is higher than that of the natural gas feed plus the oxidants (steam or oxygen), as a result of which the mechanical expanders can be operated with significantly high back pressure, making it more cost-effective to use relatively high pressure feed natural gas (with oxidants) in the syngas production and minimal energy (as necessary) for any required downstream syngas compression.

BRIEF DESCRIPTION OF THE DRAWINGS

These and other objects and features of this invention will be better understood from the following detailed description taken in conjunction with the figures, wherein.

DETAILED DESCRIPTION OF THE PRESENTLY PREFERRED EMBODIMENTS

The invention claimed herein is a method and system for co-producing fuels, chemicals, and electric power in which pressurized synthesis gas at a first pressure is expanded using a stand-alone mechanical expander or partial oxidation gas turbine, simultaneously producing electric power and an expanded synthesis gas at a second pressure which is converted to a fuel and/or a chemical. The synthesis gas, typically comprising substantial amounts of $H_2$ and CO, may be produced by any means known to those skilled in the art including gasification of carbonaceous materials such as coal and biomass, steam reforming (FIG. 7) or autothermal reforming (ATR) (FIG. 8) of natural gas or other process streams containing significant amounts of methane, ethane, propane, butane and related $C_2$—$C_4$ olefinic hydrocarbons, partial oxidation, and catalytic partial oxidation. Various oxidants and oxygen carriers including oxygen-enriched air, oxygen, air, $CO_2$, steam, and mixtures thereof may be employed. The use of $CO_2$ is particularly advantageous due to its higher molecular weight. Because gas turbines are "mass machines" with a specific volumetric throughput, using a higher molecular weight gas increases the machine's output. In addition, due to the higher molecular weight, $CO_2$ has better heat transfer properties.

In accordance with one preferred embodiment of this invention, the synthesis gas is produced from natural gas. Chemical reactions for the production of syngas from natural gas include:

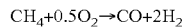

$$CH_4 + 0.5O_2 \rightarrow CO + 2H_2$$

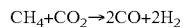

$$CH_4 + CO_2 \rightarrow 2CO + 2H_2$$

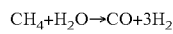

$$CH_4 + H_2O \rightarrow CO + 3H_2$$

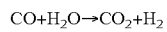

$$CO + H_2O \rightarrow CO_2 + H_2$$

As used herein, the term "natural gas" (NG) refers to gases in which the primary component is methane including conventional natural gas, associated natural gas, stranded natural gas, biogas, landfill gas, and byproduct gases from various industrial processes. In accordance with one preferred embodiment of this invention, the synthesis gas is produced by the partial oxidation of natural gas in a partial oxidation reactor (POR) using an oxidant and oxygen carrier mixture under sub-stoichiometric conditions.

Figure 1:
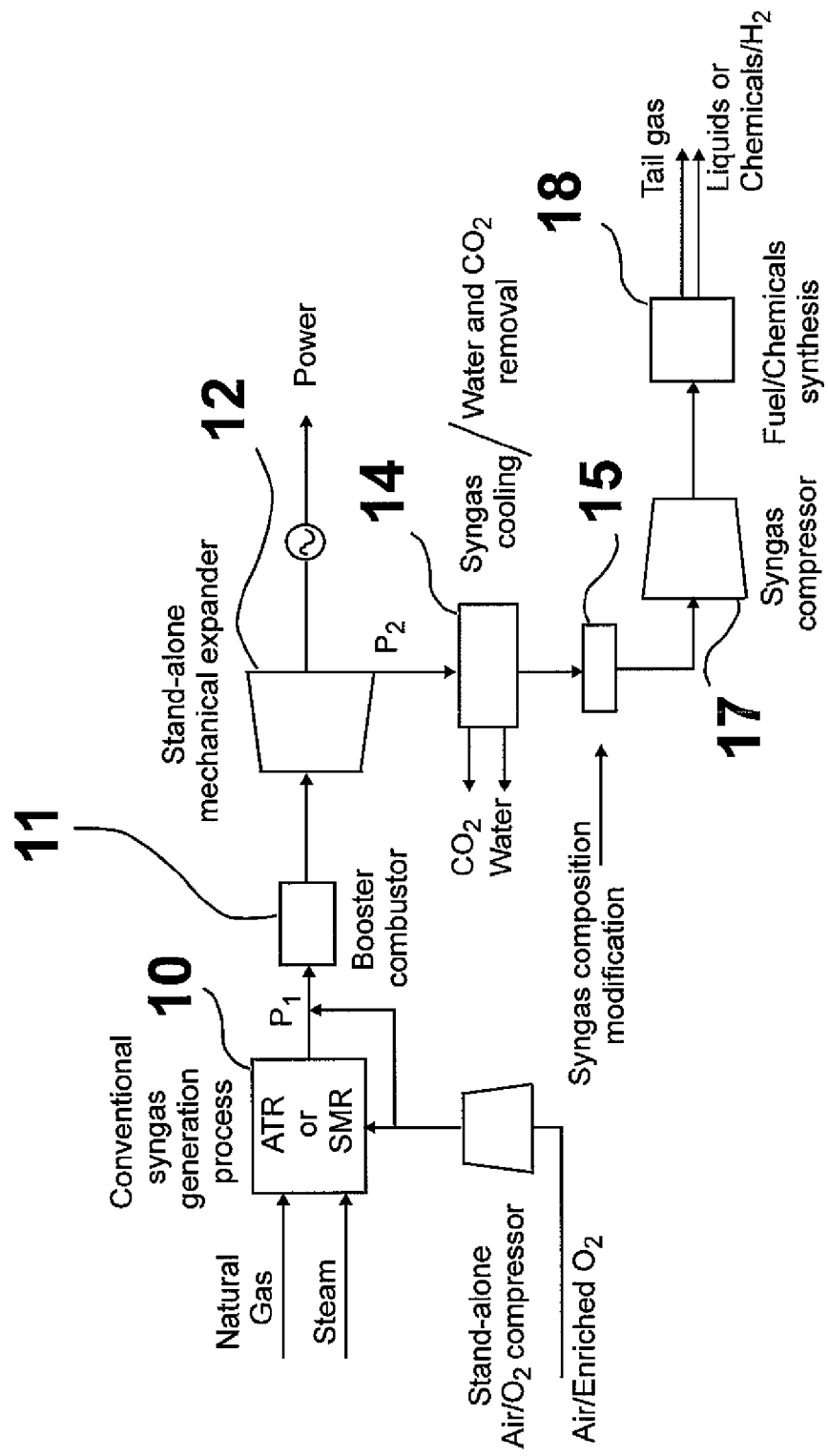
FIG. 1 is a diagrammatic representation of a method and system for co-production of fuels and electric power in accordance with one embodiment of this invention employing a stand-alone mechanical expander and an autothermal or steam methane reformer for syngas generation.
Figure 2:
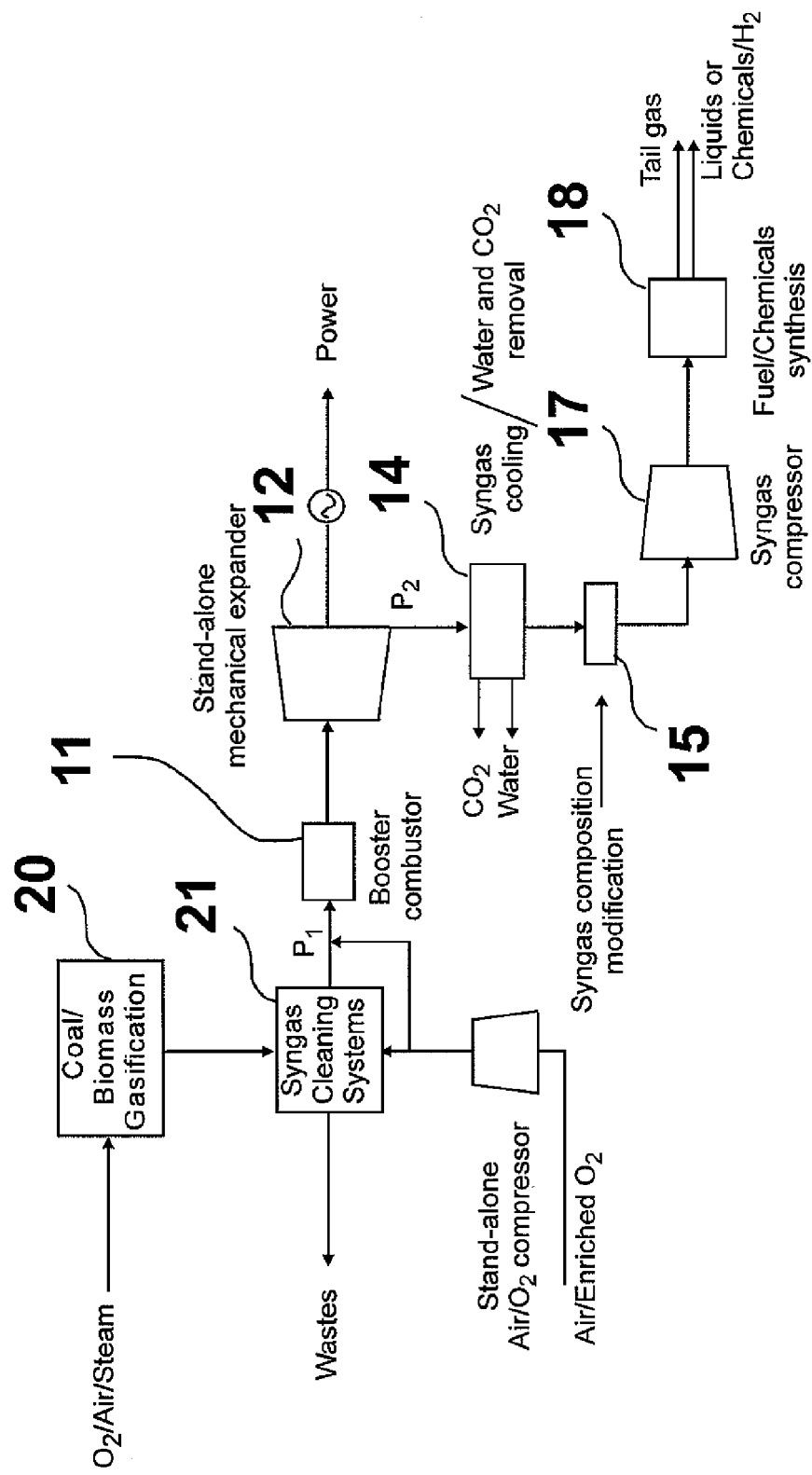
FIG. 2 is a diagrammatic representation of a method and system for co-production of fuels and electric power in accordance with another embodiment of this invention employing a stand-alone mechanical expander and coal or biomass gasification for syngas generation.

FIG. 1 is a schematic diagram showing the primary steps of the method in accordance with one embodiment of this invention in which natural gas and steam are provided to a reforming reactor vessel 10 in which the natural gas is converted to syngas, either by means of an autothermal reforming process (ATR) or a steam methane reforming process (SMR). FIG. 2 is a schematic diagram showing the primary steps of the method in accordance with one embodiment of this invention in which the syngas is generated in a conventional coal or biomass gasification reactor 20 following which the syngas is provided to a syngas cleaning process reactor 21, such as for sulfur removal. Depending on the specific syngas generation process employed and the related limitations on the maximum outlet temperature of the syngas product, and depending on the overall utility requirements for the production of liquid fuels and chemicals, a booster combustor 11, fueled by a portion of the syngas and additional air or oxygen-enriched air, may be used for increasing the syngas temperature prior to expansion of the syngas. The temperature of the syngas prior to expansion is preferably in the range of about 2200° F. to about 2500° F. The syngas generated by the reforming process is output from the process at a first pressure, $P_1$, in the range of about 60 psig to about 1500 psig.

In accordance with one embodiment of this invention, the syngas is produced in a coal or biomass gasifier. For example, in biomass gasification, methane-rich syngas from a typical catalytic tar reformer may first be sent to a hot filter unit to remove residual fine solids, and the effluent from the filter may be sent to a non-catalytic POR unit. The effluent from this non-catalytic POR may then be sent to an expander unit for (i) generating electricity and (ii) cooling the syngas. In this way, the use of a conventional "waste heat boiler" or a heat exchanger to cool the syngas from the hot filter may be avoided; in addition, this will allow conversion of a large fraction of the residual methane (and ethane/propane) to syngas. In some cases, the tar reformer may be eliminated and the syngas from the gasifier may be processed in a hot filter and in a non-catalytic partial oxidation reactor unit.

The hot syngas from the syngas generation step is introduced, in accordance with one embodiment of this invention, into a conventional stand-alone mechanical expander 12 in which the syngas is expanded to co-produce electric power and a relatively cooled syngas, typically at a temperature in the range of about 900° F. to about 1200° F. and at a second pressure, $P_2$, which is less than the first pressure, $P_1$, but which is significantly higher than one atmosphere. Unlike a conventional gas turbine expander unit, the mechanical expander need not be coupled with an air compressor. Following expansion, the cooled syngas may be subjected to additional processing in a syngas conditioning process 14, such as for water and $CO_2$ removal, and/or for syngas composition modification 15, e.g. by way of a shift reaction to increase the $H_2/CO$ ratio or $H_2$ removal. Thereafter, the "conditioned" syngas is compressed by a syngas compressor 17 and the compressed syngas may be provided to a syngas-to-liquids processing step 18 in which the syngas is converted to a liquid fuel, such as diesel, gasoline, ethanol or LPG, or the conditioned syngas may be provided to a syngas-to-chemical processing step in which the syngas is converted to a chemical, such as hydrogen, ammonia, methanol, etc.

Figure 3:
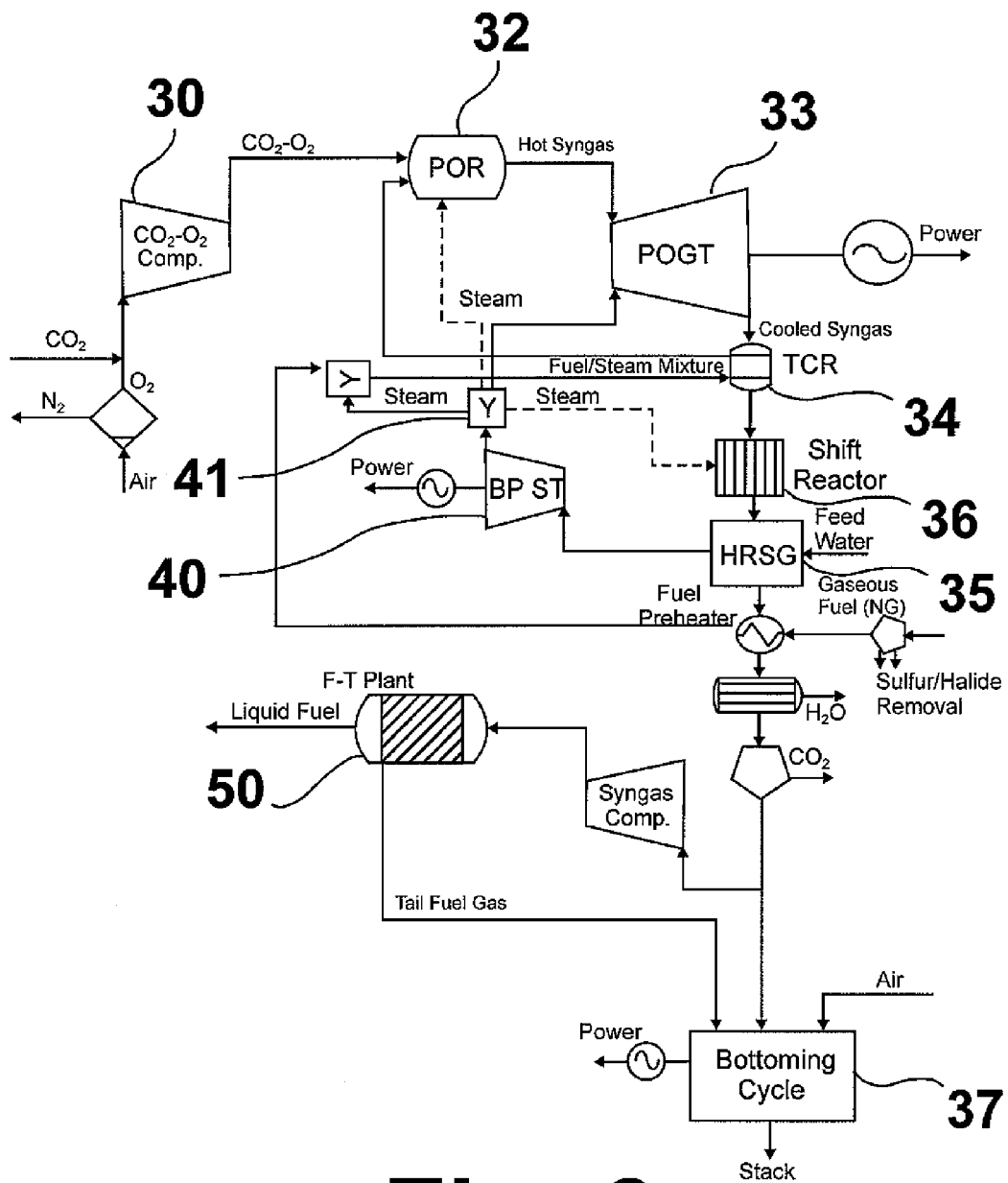
FIG. 3 is a diagrammatic representation of a method and system for co-production of fuels and electric power in accordance with one embodiment of this invention in which the syngas is produced in a partial oxidation reactor and a partial oxidation gas turbine (POGT) is used for syngas expansion and power generation.

FIG. 3 is a schematic diagram of a method for co-producing fuels, chemicals, and electric power in accordance with one embodiment of this invention employing a partial oxidation reactor for generation of the hot syngas. Example calculations for this process are shown in Table 1 herein below. In accordance with this embodiment, the $H_2/CO$ molar ratio in the syngas from the expander is about 0.69, typical of those achieved in coal gasification.

As shown in FIG. 3, a mixture of $CO_2$ and $O_2$, the components of which may be provided by any suitable source, such as (1) $CO_2$ recovered, for example, from power plants, and (2) a vacuum pressure swing adsorption (VPSA) unit or a cryogenic air separation unit (ASU) for supplying $O_2$, is used as the oxidant. The mixture is compressed in a $CO_2$—$O_2$ compressor 30, producing a compressed mixture which is provided together with a fuel to a partial oxidation reactor 32 at sub-stoichiometric conditions, in which the fuel is partially oxidized, producing a hot syngas. The hot syngas is provided to a partial oxidation gas turbine 33 in which the hot syngas is expanded, producing a cooler syngas and electric power. Depending on the downstream requirements, the cooler syngas may be subjected to any of a number of conditioning steps, which may include the use of conventional heat exchanger, heat recovery steam generators, and thermochemical recuperation, for conditioning the syngas to satisfy the downstream requirements. In accordance with one embodiment, the cooler syngas is introduced into a thermochemical recuperator (TCR) 34 where the syngas is further cooled to provide heat for the steam reforming of a portion of the natural gas fuel. The partially reformed natural gas stream (containing some $H_2$ and CO) from the reforming reaction is then fed to the partial oxidation reactor unit 32. The cooled syngas from the TCR is then processed in a shift reactor 36 in which the ratio of $H_2/CO$ in the syngas is increased and the temperature of the syngas is increased. Thermochemical recuperation increases the overall system efficiency by converting a part of the heat energy into chemical energy (including via conversion of $CO_2$ and $CH_4$ to syngas). The effluent syngas from the shift reactor 36 is provided to a heat recovery steam generator (HRSG) 35, the steam from which is provided to a steam turbine 40, resulting in the generation of additional electric power. The steam from the steam turbine is split by a suitable splitting means 41 into four streams, one of which is mixed with a fuel, producing a fuel/steam mixture which is provided to thermochemical recuperator 34, another of which is provided to the shift reactor 36, another of which is provided to the partial oxidation gas turbine 33, and the last of which is provided to the partial oxidation reactor 32.

Alternatively, the cooler syngas may be conditioned by using a water-gas shift reactor 36 to increase the $H_2/CO$ ratio, by removing water vapor and $CO_2$, and by syngas compression. The conditioned syngas then may be introduced into a suitable syngas-to-liquids process, e.g. Velocys FT diesel, or ExxonMobil MTG or Haldor-Topsoe TIGAS gasoline, or a chemical production process (e.g., ammonia, methanol). As shown in FIG. 3, the cooled syngas is conditioned for use in the production of liquid fuels in a Fischer-Tropsch plant 50. Tail gas from the Fischer-Tropsch plant is then provided to a bottoming cycle 37 for generation of additional electric power.

In accordance with one embodiment of this invention, prior to partial oxidation of the natural gas, the natural gas stream may be desulfurized to meet the requirements of downstream utilization, such as in a syngas-to-liquids process which requires syngas with very low levels of sulfur compounds.

In a conventional gas turbine operation, a large amount of excess air is required to ensure complete combustion of the natural gas fuel and to meet specific temperature limitations at the inlet of the turbine expander. In accordance with one embodiment of this invention, the air/fuel ratio is reduced significantly by reducing the amount of $O_2$/air and by increasing the amount of natural gas to attain specific sub-stoichiometric (partial oxidation) combustion conditions. The temperature at the outlet of the POR is preferably maintained in the range of about 2,200-2,500° F. However, with improvements in the metallurgy of the turbine blades in the expander section, this temperature may be increased accordingly.

In accordance with one embodiment of this invention, the POR comprises two separate sections, an initial section which may be filled with suitable catalysts to enhance reaction kinetics for conversions of the hydrocarbons to CO and $H_2$ via reactions with oxygen and a final section which may be non-catalytic.

Depending on the desired compositions of product liquid fuels and chemicals, the levels of various oxidants ($O_2$, air, steam, $CO_2$) may be controlled to achieve required levels of $H_2/CO$ ratios and nitrogen in the effluent syngas.

Following production of the syngas in the partial oxidation reactor in accordance with one embodiment of this invention, the hot syngas is expanded in a partial oxidation gas turbine (POGT) "expander" section to co-produce electric power and relatively cooled syngas (typically, at temperatures in the range of about 900-1,200° F.). Typically, for a conventional gas turbine, the inlet pressure of hot gas at the inlet of the "expander" is about 200-250 psig with an outlet pressure of about 15 psia. Depending on the stream pressure of available natural gas feed, the required pressure for the syngas feed to a downstream liquid fuels production unit (e.g. a Fischer-Tropsch liquids production facility in which the required syngas feed pressure is about 350-450 psig), and specific mechanical design of the "expander" section, the expander is operated with a similar pressure drop (e.g. about 200-250 psia) for the syngas stream, thereby enabling a reduction in the cost of the syngas compressor unit.

Figure 4:
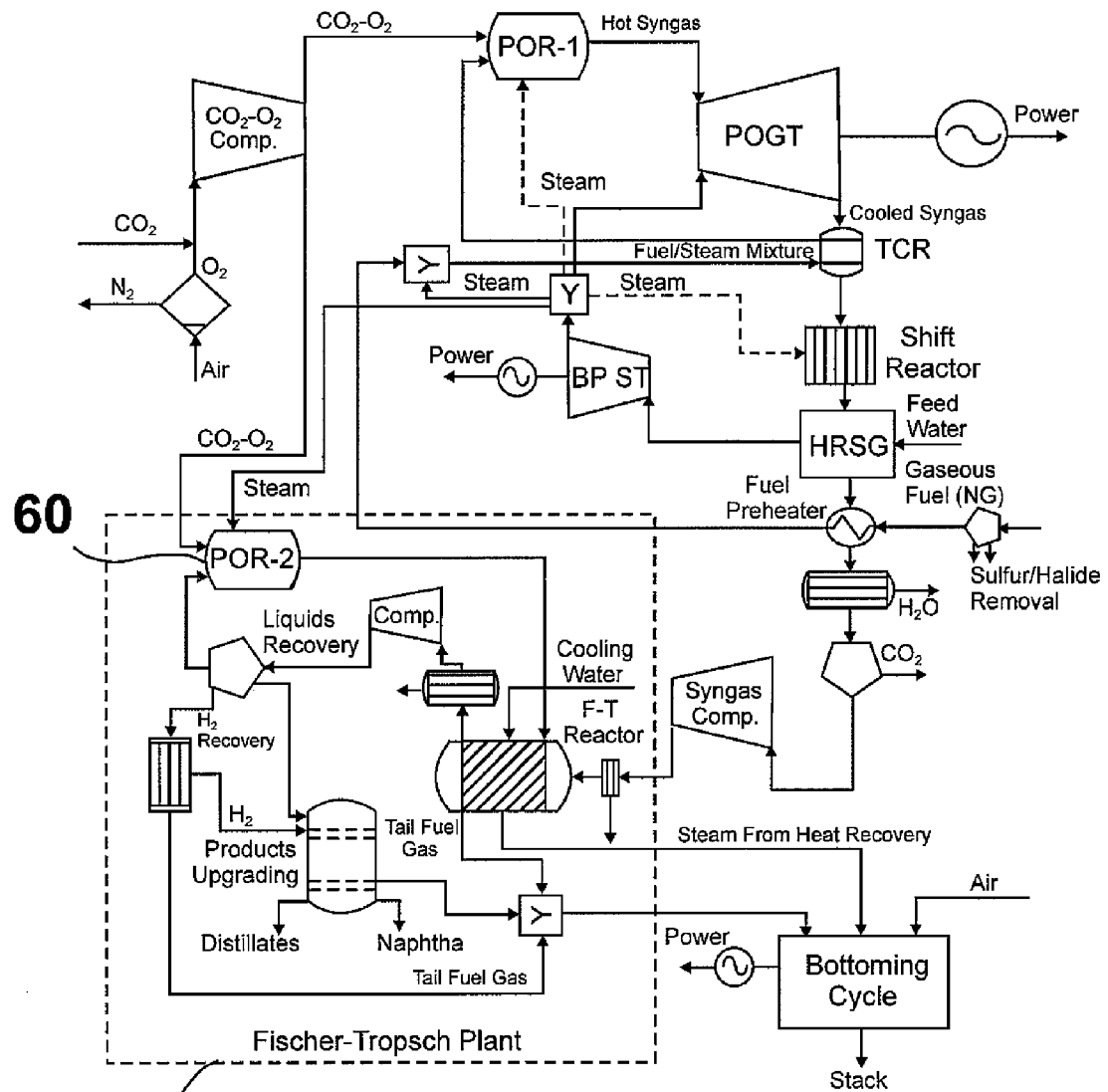
FIG. 4 is a diagrammatic representation of a POGT-based process for the co-production of Fischer-Tropsch (FT)-type liquid fuels and electric power from natural gas in accordance with one embodiment of this invention.

FIG. 4 is a schematic diagram showing the co-production of liquid fuels and electric power in accordance with one embodiment of this invention. The system and method for generating the syngas is substantially the same as the system and method shown in FIG. 3 except that a portion of the mixture of $CO_2$ and $O_2$ used as oxidant and a portion of the steam produced in a heat recovery steam generator (HSRG) are provided to a second partial oxidation reactor 60 for conversion of a portion of the hydrocarbons produced in the Fischer-Tropsch plant with enriched $O_2$ and steam to produce additional syngas that may be recycled to the Fisher-Tropsch reactor. The FT block may include other processing steps such as hydrocracking of wax made in the FT reactor.

Figure 5:
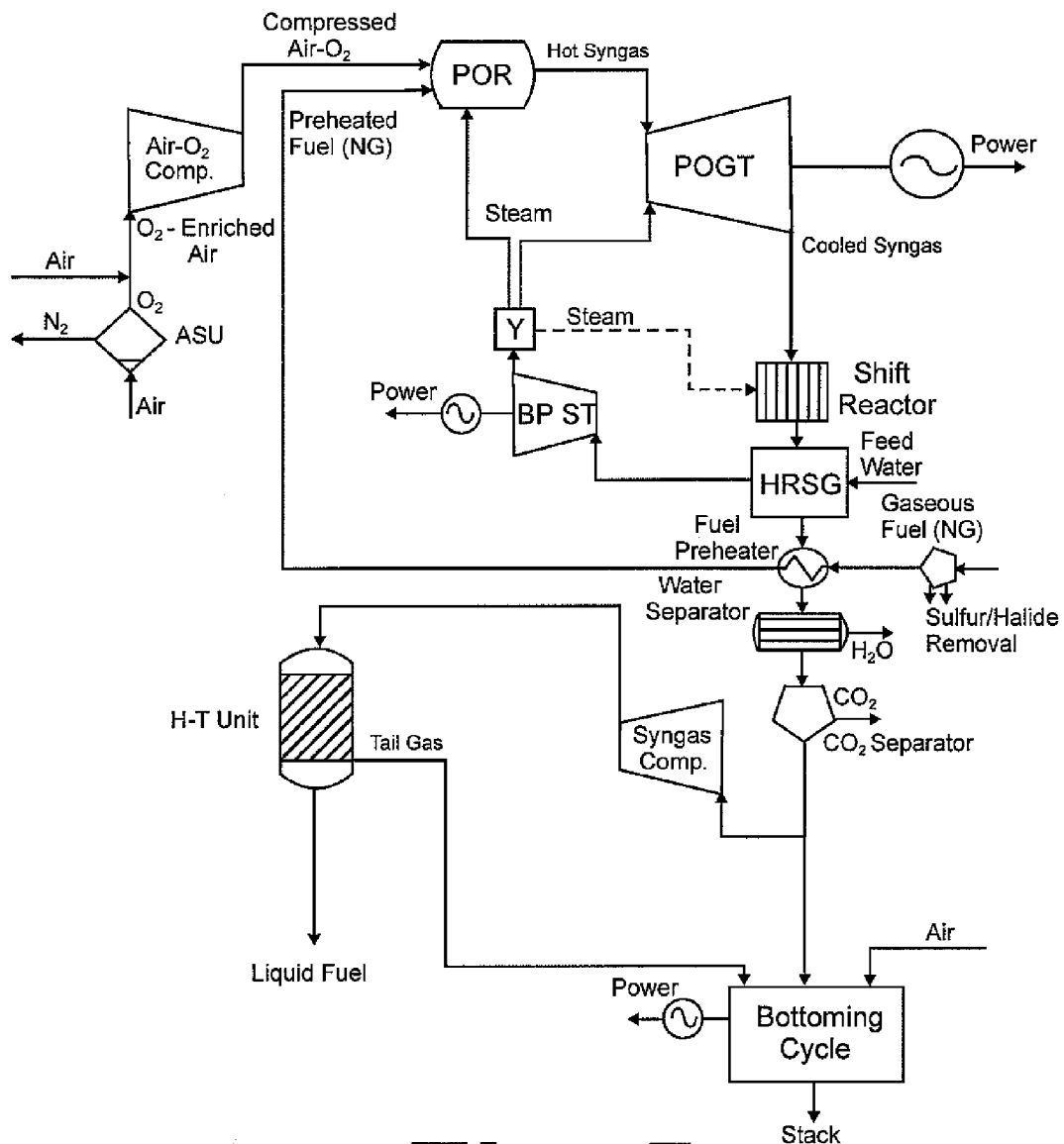
FIG. 5 is a diagrammatic representation of a POGT-based process for the co-production of gasoline-type liquid fuels and electric power from natural gas in accordance with one embodiment of this invention.

Similarly, FIG. 5 is a schematic diagram of a methanol-to-gasoline (MTG) type syngas-to-liquid production process in accordance with one embodiment of this invention for which the $H_2/CO$ ratio should be about 2.0. Table 2 (Case 4) shows typical examples of operating conditions for the POGT concept where the syngas (with a total $H_2$+CO mol % level at ~55.3%) from the expander would contain a $H_2/CO$ ratio of about 1.66. This may be increased to about 2.0 by using a shift reactor as shown in FIG. 5. The syngas pressure to the MTG section would be about 800-1500 psig; thus additional syngas compression (inlet pressure for syngas to the MTG complex shown as 345 psig in Table 2) would be required to operate the MTG plant. There are other technologies, such as the Haldor Topsoe TIGAS technology, for the production of gasoline from syngas in which the $H_2/CO$ ratio requirements could be considerably less than 2.0.

Figure 6:
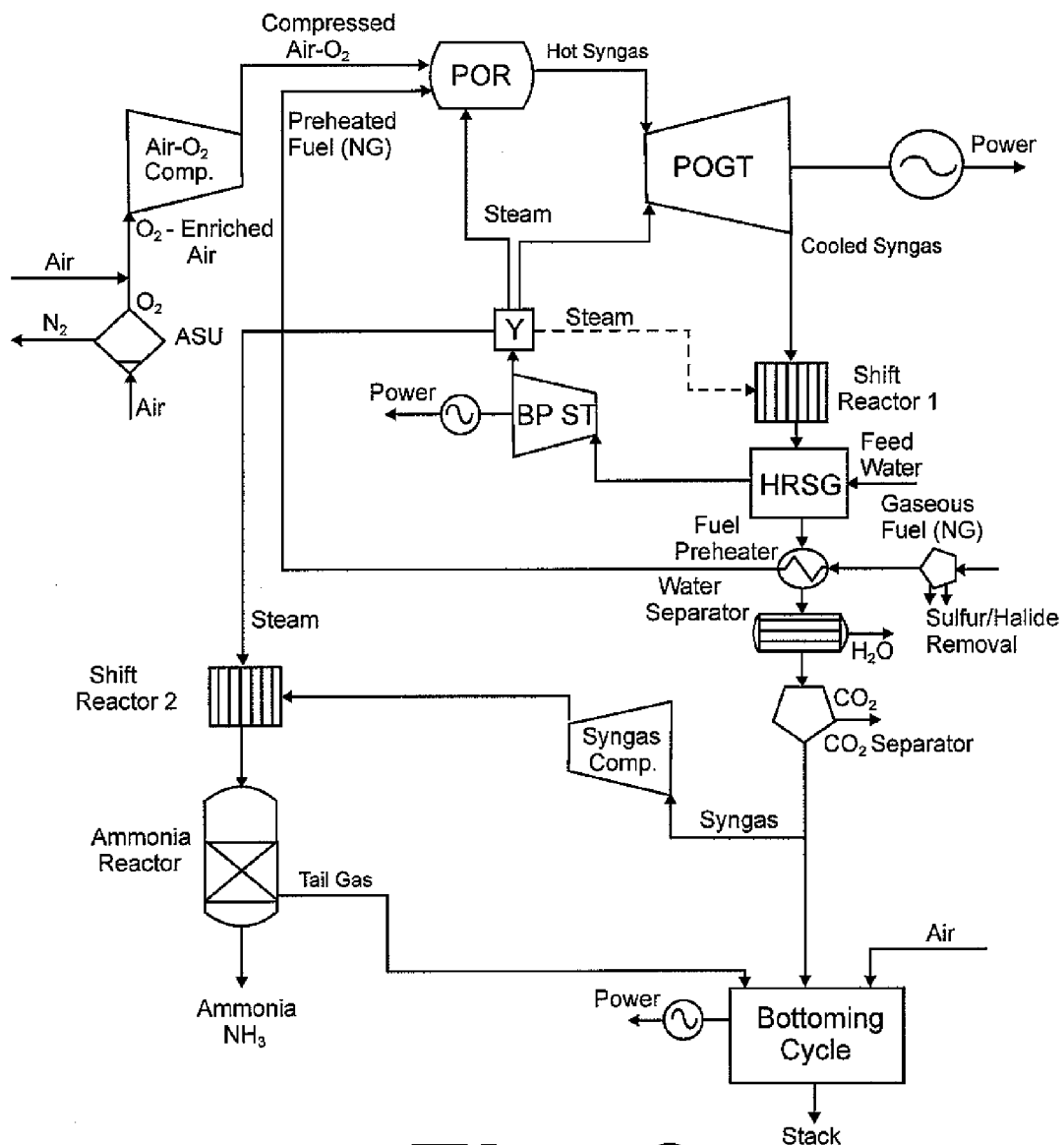
FIG. 6 is a diagrammatic representation of a method and system for co-production of ammonia and electric power in accordance with one embodiment of this invention.

FIG. 6 is a schematic diagram for a system to co-produce a chemical, e.g. ammonia, and electric power in accordance with one embodiment of this invention. The key chemical reaction is: $3H_2+N_2\rightarrow 2NH_3$. For this system, it would be necessary to increase the syngas pressure to about 200 atm before the ammonia reactor.

As previously indicated, a gas turbine expander may be used to cool the syngas through the production of electric power. With continued improvements in expander designs, the inlet temperature can be significantly higher, on the order of 2300-2400° F. at pressures of about 200-250 psig, than those which can be achieved using conventional steam methane reforming or ATR/$PO_x$. For higher pressure operations, e.g. at inlet pressures of 600 psig and effluent pressures of about 350 psig for a given gas turbine, experimentation would be required to determine the upper limit on the inlet gas temperatures.

Figure 7:
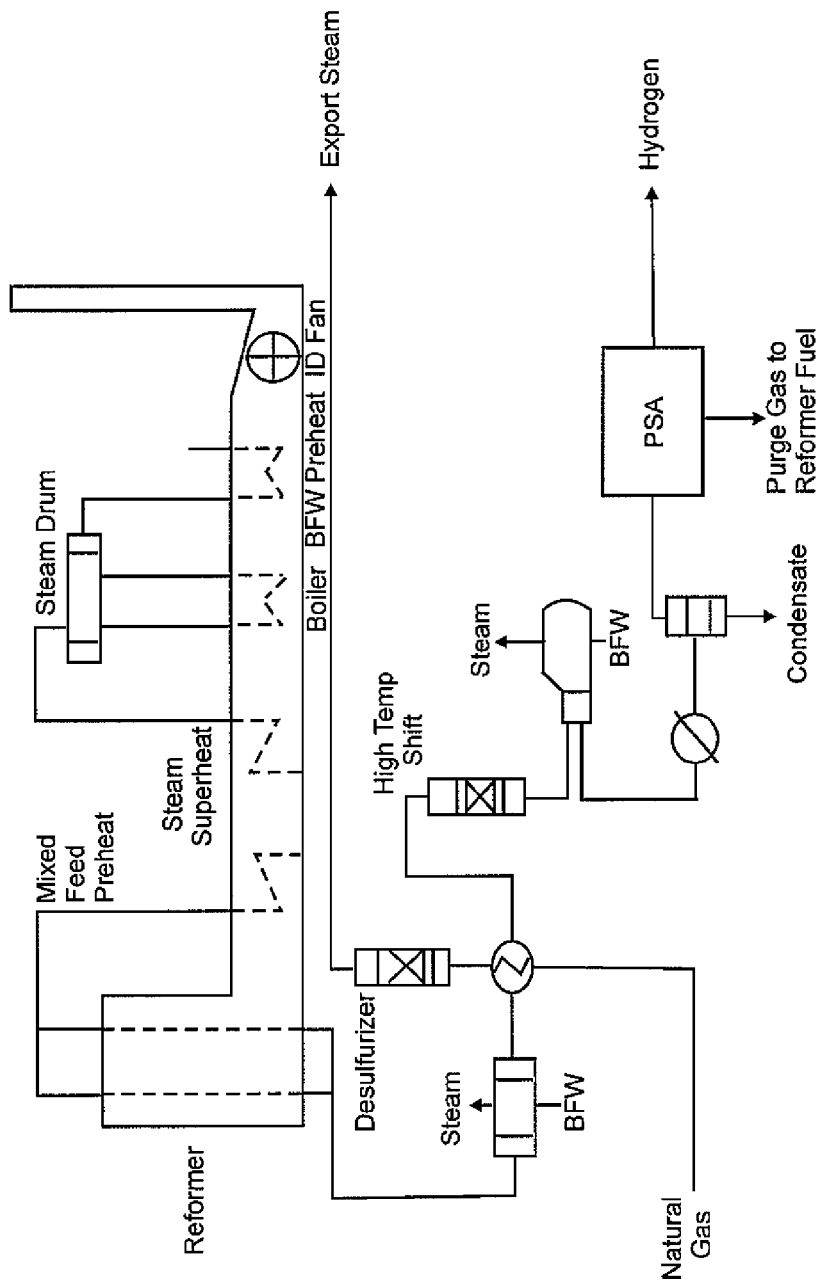
FIG. 7 is a diagrammatic representation of a conventional steam methane reforming (SMR) process for the production of syngas from natural gas and steam.
Figure 8:
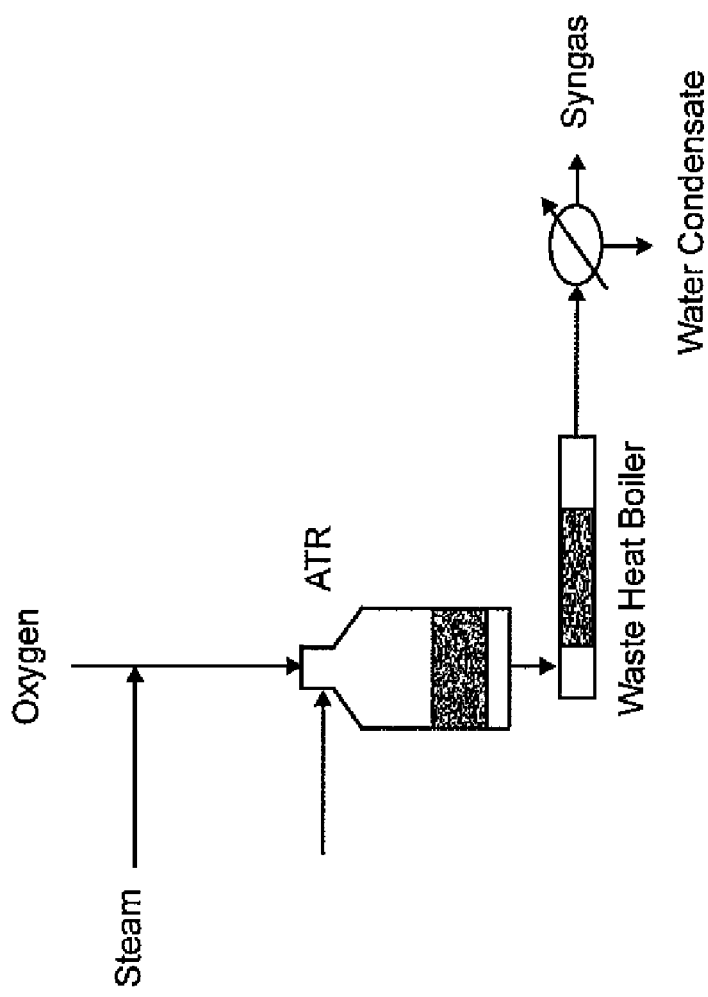
FIG. 8 is a diagrammatic representation of a conventional autothermal reforming process for the production of syngas from natural gas and oxygen/steam.

One key advantage of this invention is that it can be used to produce a concentrated $CO_2$ stream for sequestration or recycle to the front end of the process. This is similar to the ATR or $PO_x$ designs. However, in the case of a SMR, the endothermic heat of reaction for reforming reactions is supplied to tubes filled with catalysts indirectly in a furnace-type design (FIG. 7). In this case, the $CO_2$ level in the flue gas is relatively low, making $CO_2$ recovery rather difficult and expensive.

The use of a gas turbine expander for co-producing syngas as well as power significantly reduces net foot print need and overall capital/operating cost requirements and increases net thermal efficiencies for the production of liquid fuels and chemicals from natural gas, especially for small-scale plants.

Benefits of the method of this invention for the co-production of Fischer-Tropsch type diesel fuels and electric power, are summarized in Table 1.

As shown, under the POGT operating conditions (Case 2) with a Siemens SGT-400 gas turbine modified for POGT operation, the flow rate of natural gas may be increased from 6,035 lb/hr for the conventional power generation mode (Case 1) to about 37,622 lb/hr. The inlet temperature, pressure, and gas flow rates at the gas turbine expander are the same for both cases. For Case 1, the net excess power generation is about 13.0 MW vs. 18.8 MW power plus 2,060 BSD of liquids in Case 2. In contrast thereto, for a conventional F-T technology (with an ATR type reformer) used in Case 3, only about 17 MW of power plus 1785 BSD of FT liquids can be produced. Thus, the overall thermal efficiency for the POGT Case 2 is significantly higher than the efficiency of Case 3. The use of specific amounts of enriched air (with 90 mol % $O_2$ in Case 2 vs. the use of air only in Case 1) as well as $CO_2$ at the combustor inlet in Case 2 allows maintenance of the same volumetric gas flow at the expander inlet, which is a key requirement for the use of existing commercial gas turbines; provides the significantly increased usage of natural gas (37,622 lb/hr in Case 2 vs 6,035 lb/hr only in case 1) in the gas turbine combustor that can be modified suitably to handle the larger flow of natural gas; and leads to a significantly lower oxidant compressor power requirement for Case 2, only 5.5 MW, vs 16.4 MW in Case 1.

For specific applications, for example for the utilization of Associated Natural Gas (ANG) in a Floating Production Storage and Offloading (FPSO) scenario, the smaller foot print for the proposed POGT system (vs. a conventional SMR) and

TABLE 1

Comparative Data: Co-production of FT-type liquid fuels and electric power

| Case | Case 1: Power Generation only | Case-2: Co-production of FT Liquids + Power Using the proposed POGT system | Case 3: Co-production of FT Liquids + Power Using Conventional Technology |
|---|---|---|---|
| Gas Turbine Unit | Siemens SGT-400 | Siemens SGT-400 | — |
| NG flow rate, lb/hr | 6,035 | 37,622 | 37,622 |
| Air to Combustor/POR, lb/hr | 307,310 | None | Not Applicable (NA) |
| Enriched Air(@ 90% $O_2$) flow to POR, lb/hr | None | 63,818 | NA |
| Extra $CO_2$ flow to POR, lb/hr | None | 84,800 | None |
| Total gas or Syngas at the Expander Inlet (P:241 psia and T: 2280° F.), Million Cu.ft/hr | 1.19 | 1.19 | |
| Conc. of $O_2$ at Combustor or POR Inlet, mol % | 20.7 | 47.4 | NA |
| Syngas composition after the Expander, mol % | — | | Not available in this specific Reference |
| $H_2$ | | 32.9 | |
| CO | | 47.5 | |
| $CO_2$ | | 16.0 | |
| $N_2$ | | 3.5 | |
| $H_2$/CO molar ratio of syngas to the FT Complex | | 0.69 | 2.0 |
| Pressure of syngas to the Fischer Tropsch Complex, psig | | 345 | 490 |
| Compressor Power Need, MW | 16.4 | 5.5 | NA |
| Total Electric Power Output at the Expander, MW | 29.3 | 30.1 | NA |
| Net excess power produced, MW | 13.0 | 18.8[2] | 17.0 |
| Total liquids produced, bbl/day | — | 2,060[3] | 1,785 |

1. G. N. Choi et al (Bechtel Corp) & N. L. Carr et al (Syncrude Technology Inc)
2. Includes power consumption for Syngas compressor (from 14.8 psia to 345 psig)
3. Estimated Based on: Ref.-DOE NETL Report 2007/1260, Apr. 9, 2007 co-production of some electric power (using the same gas turbine) may be quite advantageous.

Table 2 shows specific data to indicate that the POGT process can be tailored to produce syngas with a range of $H_2/CO$ ratio that may be needed for a specific syngas-to-liquids technology. For example, in the ExxonMobil methanol-to-gasoline (MTG) process, the syngas feed to a MTG unit should preferably have a $H_2/CO$ ratio of about 2.0. As shown for the Case 4 (referring to FIG. 5), the amounts of air and enriched-oxygen may be varied to modify the composition of the syngas produced and then a water-gas shift reactor may be used to produce a syngas with the desired $H_2/CO$ ratio.

use catalytic steam-reforming technology: $C_3H_8O_3+3H_2O=3CO_2+7H_2$; however, this would require the use of catalysts and furnaces for supplying the heat of reforming.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

TABLE 2

Comparative Data: Co-production of FT-type liquid fuels and electric power
Basis: Gas Turbine Siemens SGT-400

| Case | Case-2: Co-production of FT diesel Liquids + Power Using the proposed POGT system | Case 4: Co-production of MTG-based gasoline type Liquids + Power Using the proposed POGT system | Case 5: Co-production of Ammonia + Power Using the proposed POGT system |
|---|---|---|---|
| NG flow rate, lb/hr | 37,622 | 31,883 | 38,878 |
| Air to Combustor/POR, lb/hr | None | 122,778 | 61,693 |
| Enriched $O_2$ (@ 90% O2) flow to POR, lb/hr | 63,818 | 22,992 | 44,601 |
| Extra $CO_2$ flow to POR, lb/hr | 84,800 | none | none |
| Total gas or Syngas at the Expander Inlet (P:241 psis and T: 2280 F), Million Cuft/hr | 1.20 | 1.29 | 1.24 |
| Total syngas (on a $CO_2$ and water free basis; before the Shift Reactor) produced, lb/hr | 146,083 | 160,436 | 129,207 |
| Conc. of $O_2$ at Combustor or POR Inlet, mol % | 47.4 | 30.9 | 48.3 |
| Syngas composition after the Expander, mol % | | | |
| $H_2$ | 32.9 | 34.5 | 46.7 |
| CO | 47.5 | 20.8 | 27.2 |
| $CO_2$ | 16.0 | 2.9 | 2.8 |
| $N_2$ | 3.5 | 41.4 | 23.1 |
| $H_2/CO$ molar ratio of syngas to the liquid production Complex | 0.69 | 1.66 | 1.72 |
| Pressure of syngas to the liquid production Complex, psig | 345 | 345 | 345 |
| Net power produced, MW | 18.8 | 16.4 | 17.7 |
| $H_2/CO$ molar ratio after the Water-Gas Shift Reactor | No Shift Reactor is used | 2.0 | 3.0 |

Similar comparative data for the co-production of ammonia plus electric power (FIG. 6) are also shown in Table 2, Case 5. In this case, the syngas from the expander is compressed to about 345 psig. Following the shift reactor, the pressure may be increased to the desired pressure needed for the ammonia reactor.

Another beneficial use of this invention is the production of $H_2$ from glycerol ($C_3H_8O_3$). Isis Innovation Inc. in the United Kingdom has developed a process to produce bio-methanol by reacting glycerol with $H_2$. Glycerol is a byproduct from bio-diesel production using vegetable oils. A key requirement in building such a bio-methanol plant is the availability of $H_2$ at the plant site. Glycerol may be fed with enriched air (at 90 mol % $O_2$) plus some steam mixture to a partial oxidation gas turbine combustor to produce $H_2$ (some $CO_2$, $N_2$, and $H_2O$). Other competing processes are being developed by others to

We claim:

1. A method for co-production of fuels, chemicals, and electric power comprising the steps of:

generating a pressurized synthesis gas having a first pressure and having a first temperature in a range of about 2200° F. to about 2500° F.;

expanding said pressurized synthesis gas at said first temperature using a stand-alone mechanical expander or a partial oxidation gas turbine, simultaneously producing electric power and an expanded synthesis gas at a second pressure and a second temperature; and converting said expanded synthesis gas to at least one of a fuel and a chemical.

2. The method of claim 1, wherein said second pressure is less than said first pressure.

3. The method of claim 2, wherein said second pressure is greater than about 1 atm.

4. The method of claim 1, wherein said pressurized synthesis gas is produced from a fuel and an oxidant introduced into a reactor vessel.

5. The method of claim 4, wherein said oxidant is mixed with $CO_2$.

6. The method of claim 5, wherein a $CO_2/O_2$ molar ratio is in the range of about 0.1 to about 2.0.

7. The method of claim 6, wherein said $CO_2/O_2$ molar ratio is in the range of about 0.9 to about 1.1.

8. The method of claim 4, wherein said oxidant is selected from the group consisting of air, oxygen, oxygen-enriched air, steam, and mixtures thereof.

9. The method of claim 1, wherein said converting of said expanded synthesis gas produces a tail gas.

10. The method of claim 9, wherein said tail gas is employed in a bottoming cycle.

11. The method of claim 1, wherein said first pressure is greater than about 60 psig.

12. The method of claim 11, wherein said first pressure is greater than about 1500 psig.

13. The method of claim 1, wherein said fuel is a Fischer-Tropsch liquid fuel.

14. The method of claim 13, wherein a portion of said liquid fuel is introduced into a second partial oxidation reactor and converted to additional syngas, which additional syngas is recycled to a Fisher-Tropsch reactor used to produce said liquid fuel.

15. The method of claim 1, wherein said synthesis gas is introduced into a combustor and heated to an inlet temperature of said stand-alone mechanical expander or said partial oxidation gas turbine.

16. A method for co-production of fuels, chemicals, and electric power comprising the steps of:
   introducing a fuel, an oxidant, and $CO_2$ into a reactor vessel, producing pressurized synthesis gas at a first pressure having a temperature in a range of about 2200° F. to about 2500° F.;
   expanding said pressurized synthesis gas at said temperature, simultaneously producing electric power and an expanded synthesis gas at a second pressure less than said first pressure and greater than one atmosphere; and
   converting said expanded synthesis gas to at least one of a fuel and a chemical.

17. The method of claim 16, wherein said oxidant is selected from the group consisting of air, oxygen-enriched air, oxygen, steam, and mixtures thereof.

18. The method of claim 16, wherein said first pressure is greater than about 60 psig.

19. The method of claim 18, wherein said first pressure is greater than about 1500 psig.

20. The method of claim 16, wherein said pressurized synthesis gas is expanded in a stand-alone mechanical expander or a partial oxidation gas turbine.

21. The method of claim 20, wherein said pressurized synthesis gas is introduced into a combustor prior to expansion and heated to an inlet temperature of said stand-alone mechanical expander or said partial oxidation gas turbine.

* * * * *